(12) United States Patent
Beall et al.

(10) Patent No.: US 10,703,671 B2
(45) Date of Patent: Jul. 7, 2020

(54) PHOTOSENSITIVE GLASSES AND GLASS CERAMICS AND COMPOSITE GLASS MATERIALS MADE THEREFROM

(71) Applicant: Corning Incorporated, Corning, NY (US)

(72) Inventors: George Halsey Beall, Big Flats, NY (US); Nicholas Francis Borrelli, Elmira, NY (US); Joseph Francis Schroeder, III, Corning, NY (US); Thomas Philip Seward, III, Elmira, NY (US)

(73) Assignee: Corning Incorporated, Corning, NY (US)

( * ) Notice: Subject to any disclaimer, the term of this patent is extended or adjusted under 35 U.S.C. 154(b) by 480 days.

(21) Appl. No.: 15/413,731

(22) Filed: Jan. 24, 2017

(65) Prior Publication Data

US 2017/0210665 A1  Jul. 27, 2017

Related U.S. Application Data

(60) Provisional application No. 62/287,157, filed on Jan. 26, 2016.

(51) Int. Cl.
| | |
|---|---|
| *C03C 10/00* | (2006.01) |
| *C03B 32/00* | (2006.01) |
| *C03C 3/085* | (2006.01) |
| *C03C 3/095* | (2006.01) |
| *C03C 3/11* | (2006.01) |
| *C03C 3/112* | (2006.01) |
| *C03C 4/04* | (2006.01) |
| *C03C 23/00* | (2006.01) |
| *C03B 32/02* | (2006.01) |

(52) U.S. Cl.
CPC ......... *C03C 10/0027* (2013.01); *C03B 32/02* (2013.01); *C03C 3/085* (2013.01); *C03C 3/095* (2013.01); *C03C 3/11* (2013.01); *C03C 3/112* (2013.01); *C03C 4/04* (2013.01); *C03C 23/002* (2013.01); *C03C 23/0025* (2013.01); *C03C 2204/04* (2013.01)

(58) Field of Classification Search
None
See application file for complete search history.

(56) References Cited

U.S. PATENT DOCUMENTS

| | | | |
|---|---|---|---|
| 2,651,145 A | 9/1953 | Stookey | |
| 3,161,528 A | 12/1964 | Eppler | |
| 3,663,193 A | 5/1972 | Wilson | |
| 5,972,816 A * | 10/1999 | Goto | C03C 3/097 501/4 |
| 6,387,509 B1 * | 5/2002 | Goto | C03C 3/062 428/426 |
| 7,829,489 B2 * | 11/2010 | Borrelli | C03C 3/095 501/13 |
| 2004/0126698 A1 | 7/2004 | Borrelli et al. | |
| 2004/0180773 A1 | 9/2004 | Schreder et al. | |
| 2014/0238078 A1 | 8/2014 | Boek et al. | |
| 2016/0340230 A1 | 11/2016 | Beall et al. | |

FOREIGN PATENT DOCUMENTS

JP    63166736 A    7/1988

OTHER PUBLICATIONS

Borrelli, "Glass-cermaics by photosensitive processes" International Journal of Applied Glass Science, 6(3) 2015, pp. 268-274.
International Search Report and Written Opinion CT/US2017/015176 dated Apr. 3, 2017.

* cited by examiner

*Primary Examiner* — David Sample
(74) *Attorney, Agent, or Firm* — Russell S. Magaziner

(57) ABSTRACT

Photosensitive lithium zinc aluminosilicate glasses that can be selectively irradiated and cerammed to provide patterned regions of glass and lithium-based glass ceramic, and composite glass articles made from such glasses and glass ceramics are provided. Compressive and tensile stress at the interface of the lithium-based glass-ceramic and lithium zinc aluminosilicate glass may be used to frustrate crack propagation in such a composite glass/glass ceramic article. Methods of making composite glass articles comprising such lithium-based glass ceramics and lithium zinc aluminosilicate glasses are also provided.

13 Claims, 11 Drawing Sheets

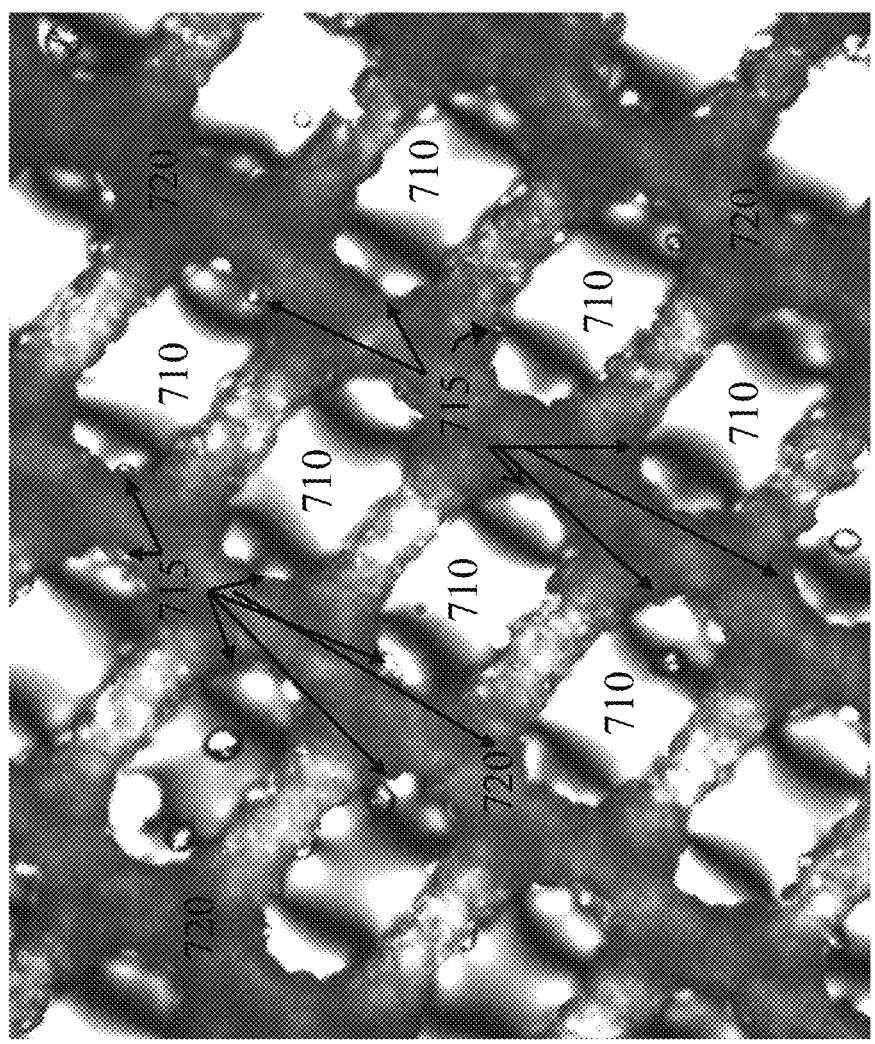

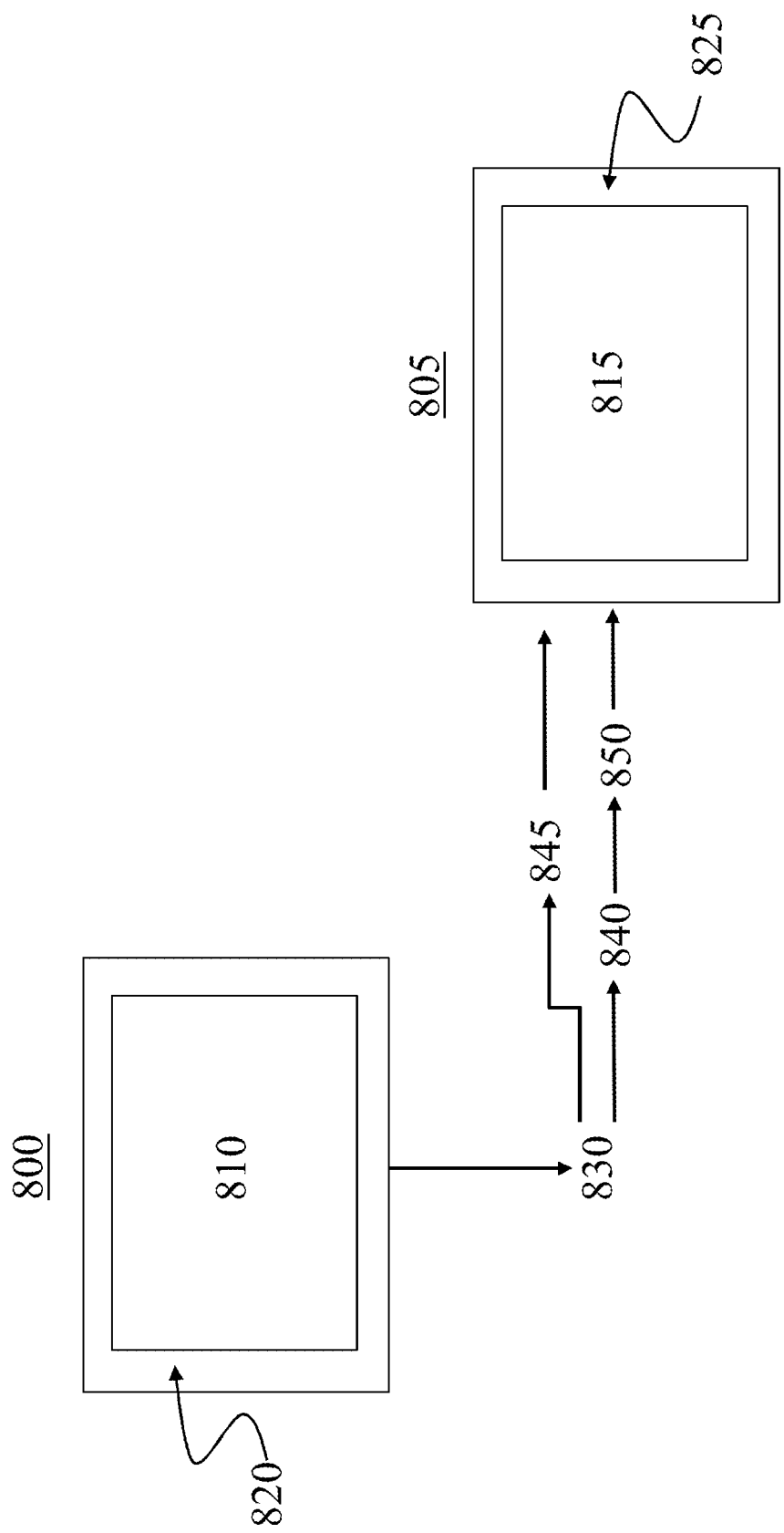

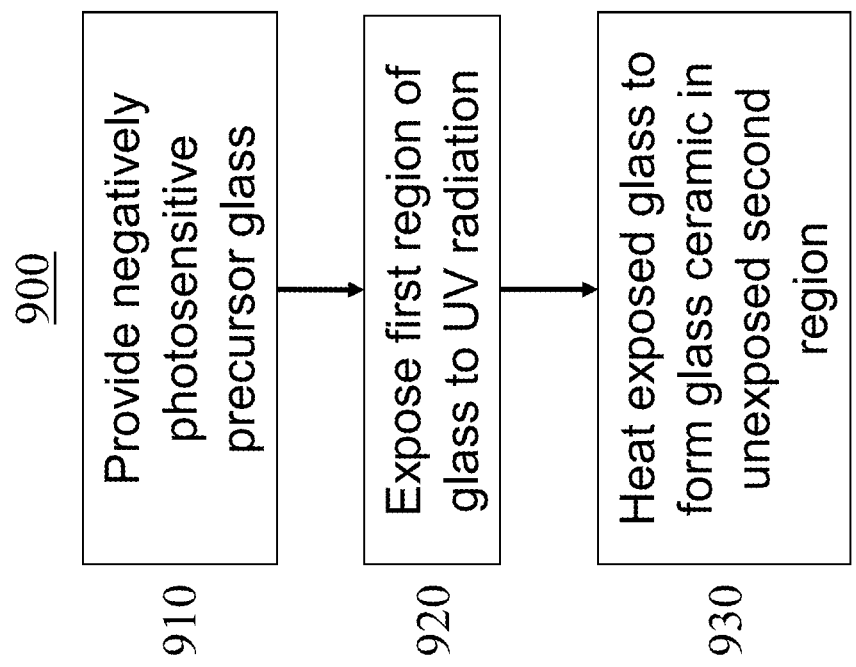

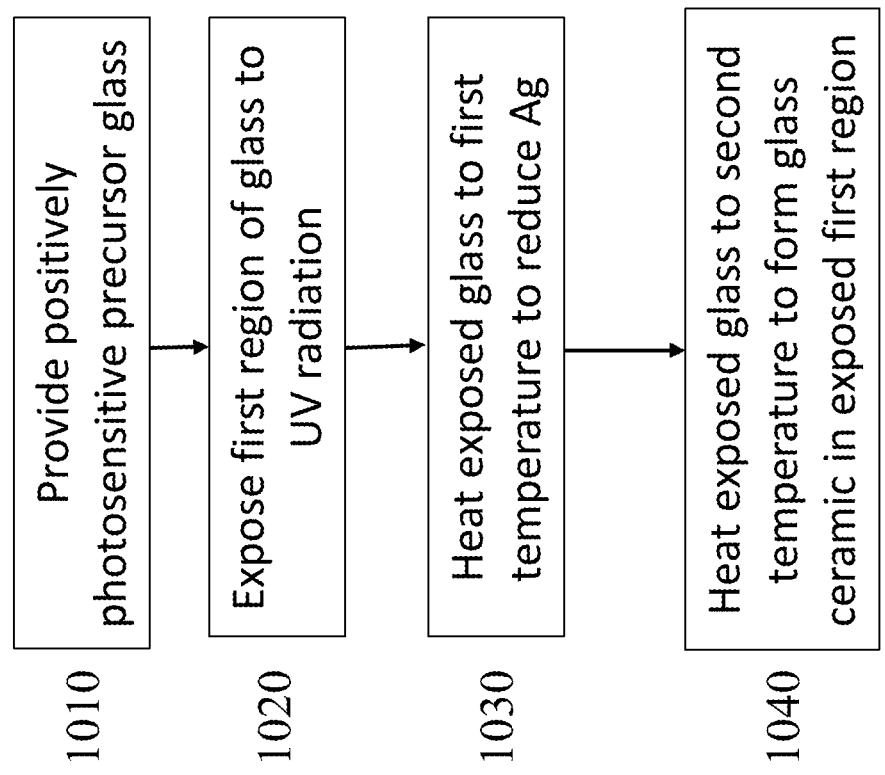

PHOTOSENSITIVE GLASSES AND GLASS CERAMICS AND COMPOSITE GLASS MATERIALS MADE THEREFROM

CROSS REFERENCE TO RELATED APPLICATIONS

This application claims the benefit of priority under 35 U.S.C. § 119 of U.S. Provisional Application Ser. No. 62/287,157 filed on Jan. 26, 2016, the content of which is relied upon and incorporated herein by reference in its entirety.

BACKGROUND

The disclosure relates to photosensitive glass. More particularly, the disclosure relates to photosensitive glasses that can be treated to form glass ceramics. Even more particularly, the disclosure relates to photosensitive lithium zinc aluminosilicate glasses and glass ceramics that may include both transparent and opaque or translucent (i.e., opalized) regions.

Glass-ceramics are nominally produced by a thermal process in which the as-made glass is thermally treated to produce a controlled crystalline phase. Cerium and silver photosensitizers have been used in glass systems, such as FOTOFORM™ and FOTA-LITE™, to produce photosensitive materials in which the crystal content is well below the 50% level that typically defines a glass ceramic. In such glass systems, an opal (i.e., opaque, optically dense, white, light scattering) phase containing NaF is formed in regions of the glass that are exposed to short wavelength light followed by heat treatment, while unexposed regions of the glass remain clear.

SUMMARY

Photosensitive lithium zinc aluminosilicate glasses that can be selectively cerammed to provide patterned regions of glass and glass ceramic, and composite glass articles made from such glasses and glass ceramics are provided. When these glasses are exposed to ultraviolet (UV) radiation and thermally treated (cerammed), a lithium-based glass ceramic having a β-quartz crystal structure is formed in selected regions of the glass. In some embodiments, the lithium zinc aluminosilicate glass is "negatively" photosensitive; i.e., a lithium-based glass ceramic is formed in the portion of the glass that is not exposed to, or shielded from, the UV radiation while the transparent lithium zinc aluminosilicate glass remains in those regions that are exposed to the UV radiation. In other embodiments, the lithium zinc aluminosilicate glass is "positively" photosensitive; i.e., a lithium-based glass ceramic is formed in the portion of the glass that is exposed to the UV radiation while the transparent lithium zinc aluminosilicate glass remains in those regions that are not exposed to the UV radiation. In some embodiments, the lithium-based glass ceramic is "opalized"; i.e., opaque or translucent, or in some embodiments opalescent. Compressive and tensile stress at the interface of the lithium-based glass-ceramic and lithium zinc aluminosilicate glass may be used to frustrate to crack propagation in such a composite glass/glass ceramic article. Methods of making composite glass articles comprising such lithium-based glass ceramics and lithium zinc aluminosilicate glasses are also provided.

Accordingly, one aspect of the disclosure is to provide a composite glass article comprising a first region and a second region. The first region comprises a lithium-based glass ceramic. The lithium-based glass ceramic comprises a residual glass phase and a ceramic phase comprising a lithium aluminosilicate phase having a lithium aluminosilicate stuffed β-quartz structure. The second region comprises a lithium zinc aluminosilicate glass comprising at least one sensitizing agent and at least one nucleating agent. The lithium zinc aluminosilicate glass is photosensitive to ultraviolet radiation having a wavelength in a range from about 248 nm to about 360 nm.

A second aspect of the disclosure is to provide a lithium zinc aluminosilicate glass comprising at least one sensitizing agent and at least one nucleating agent, wherein the lithium zinc aluminosilicate glass is photosensitive to radiation having a wavelength in a range from about 248 nm to about 360 nm.

A third aspect of the disclosure is to provide a method of making a composite glass article comprising a lithium zinc aluminosilicate glass and a lithium-based glass ceramic. The lithium-based glass ceramic comprises a residual glass phase and a ceramic phase, wherein the ceramic phase comprises a lithium aluminosilicate phase having a lithium aluminosilicate β-quartz structure. The method comprises: providing a lithium zinc aluminosilicate precursor glass comprising at least one sensitizing agent and at least one nucleating agent, wherein the lithium zinc aluminosilicate glass is negatively photosensitive; exposing a first region of the lithium zinc aluminosilicate precursor glass with ultraviolet radiation having a wavelength in a range from about 248 nm to about 360 nm, wherein a second region of the lithium zinc aluminosilicate glass is unexposed to the ultraviolet radiation; and heating the exposed lithium zinc aluminosilicate precursor glass to form the lithium-based glass ceramic in the second region.

A fourth aspect of the disclosure is to provide a method of making a composite glass article comprising a lithium zinc aluminosilicate glass and a lithium-based glass ceramic. The lithium-based glass ceramic comprises a residual glass phase and a ceramic phase, wherein the ceramic phase comprises a lithium aluminosilicate phase having a lithium aluminosilicate β-quartz structure, and a residual glass phase. The method comprises: providing a lithium zinc aluminosilicate precursor glass comprising at least one sensitizing agent and at least one nucleating agent, wherein the lithium zinc aluminosilicate glass is positively photosensitive; exposing a first region of the lithium zinc aluminosilicate precursor glass to ultraviolet radiation having a wavelength in a range from about 248 nm to about 360 nm, wherein a second region of the lithium zinc aluminosilicate precursor glass is unexposed to the ultraviolet radiation; heating the lithium zinc aluminosilicate precursor glass at a first temperature for a first time period; and heating the lithium zinc aluminosilicate precursor glass at a second temperature for a second time period to form the lithium-based glass ceramic in the first region.

These and other aspects, advantages, and salient features will become apparent from the following detailed description, the accompanying drawings, and the appended claims.

BRIEF DESCRIPTION OF THE DRAWINGS

FIG. 7 is a photograph showing the internal stress produced in a patterned composite glass article comprising a positively photosensitive lithium zinc aluminosilicate glass and the lithium-based glass ceramic described herein;

FIG. 8 is a schematic representation of a patterned composite glass article described herein;

FIG. 9 is a flow chart describing a method of making a composite glass article from a negatively photosensitive lithium zinc aluminosilicate precursor glass; and FIG. 10 is a flow chart describing a method of making a composite glass article from a positively photosensitive lithium zinc aluminosilicate precursor glass.

DETAILED DESCRIPTION

Figure 1:
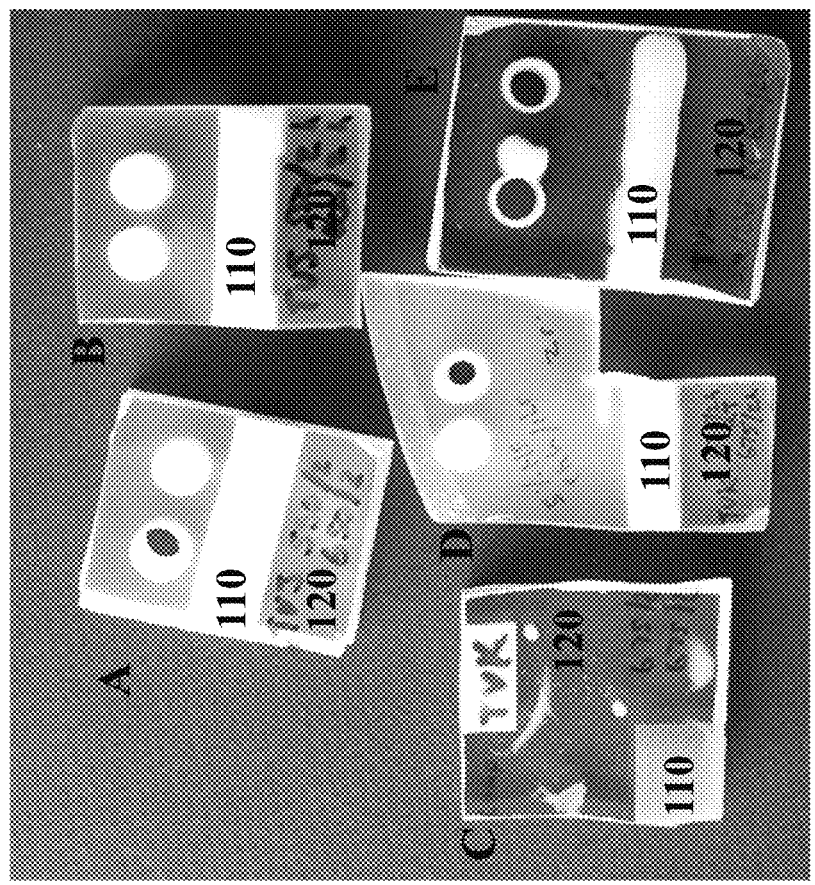
FIG. 1 is a photograph of positively photosensitive lithium zinc aluminosilicate precursor glass/glass-ceramic samples in which $ZrO_2$ was added to a negatively photosensitive lithium zinc aluminosilicate precursor glass composition.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "composite glass article" and "composite glass ceramic articles" are used in their broadest sense to include any object made wholly or partly of glass and glass ceramic. Unless otherwise specified, all compositions are expressed in terms of weight percent (wt %). As used herein, the terms "ceram" and "ceramming" refer to a heat treatment (or heat treatments) or process in which a precursor glass is converted to a glass-ceramic.

As used herein, the term "glass ceramic" refers to a material comprising a glass phase and a crystalline ceramic phase, wherein the ceramic phase accounts for or comprises at least 50 volume percent of the material. The terms "glass ceramic" and "crystalline" are equivalent terms and may be used interchangeably herein.

As used herein, the term "opal" refers to an opaque, optically dense, white, and/or light scattering glass, ceramic, or glass ceramic material that may, but does not have to, have opalescent properties. The term "opalizing" refers to a process of transforming a glass, ceramic, or glass ceramic material into an opal material. An opal or opalized material comprises at least one crystalline or ceramic phase in which the crystalline particles have a mean particle size that is within or greater than the wavelength range of visible light (400 nm-750 nm). As used herein, the term "translucent" refers to a material that transmits and diffuses light such that objects beyond the material cannot be seen clearly with the unaided eye.

As used herein, the terms "reverse photosensitive," "negative photosensitive," and "negatively photosensitive" refer to a material and process whereby a region of the material exposed to electromagnetic radiation remains clear, while an unexposed remainder of the material becomes opalized or translucent when the material is subsequently heated at a temperature greater than room temperature. Conversely, the terms "positive photosensitive" and "positively photosensitive" refer to a material and process whereby a region of the material exposed to electromagnetic radiation becomes opalized or translucent, while the unexposed remainder of the material remains clear.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue. Thus, a glass that is, for example, referred to as being "substantially free of $TiO_2$" or "free of $TiO_2$" is one in which $TiO_2$ is not actively added or batched into the glass, but may be present in very small amounts (e.g., ≤100 ppm or, in some embodiments, ≤50 ppm) as a contaminant.

Referring to the drawings in general, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

In one aspect, a photosensitive lithium zinc aluminosilicate glass is provided. The glass comprises at least one sensitizing agent and at least one nucleating agent. The lithium zinc aluminosilicate glass is photosensitive to ultraviolet (UV) radiation having a wavelength in a range from about 248 nm to about 360 nm. In some embodiments, the at least one sensitizing agent may include, but is not limited to, at least one of silver and cerium. The at least one nucleating agent may include, but is not limited to, silver and/or at least one halogen or halide. In some embodiments, the at least one nucleating agent comprises at least one of fluorine, chlorine, and bromine. In particular embodiments, the at least one nucleating agent comprises fluorine and/or bromine.

In some embodiments, the photosensitive lithium zinc aluminosilicate glass is negatively photosensitive; i.e., a region of the material exposed to ultraviolet radiation and subsequently heat treated or cerammed remains transparent, while the remainder of the material that is not exposed to, or shielded from, such radiation and is subsequently heat treated at a temperature of at least about 500° C. becomes opalized or translucent. In such embodiments, the photosensitive glass comprises a nucleating agent and a sensitizing agent such as, but not limited, to fluorine. Silver, which acts as the nucleating agent in the exposed portion of the glass, has a face-centered crystal (FCC) structure with a lattice constant of 0.408 nm, whereas LiF has a FCC structure with a lattice constant of 0.407 nm. Because the Ag lattice constant closely matches that of LiF, Ag serves as highly effective nucleating agent for LiF. The multiplicity of these nucleation sites is so great and the nucleation is so prolific that the LiF crystals do not grow to a size at which they noticeably scatter light, thus making the exposed region transparent. In some embodiments, the crystallites formed in this exposed region are smaller than the wavelength of visible light (400 nm-750 nm). In some embodiments, the crystallites formed in the exposed region are less than 100 nm in size.

In those regions of the negatively photosensitive lithium zinc aluminosilicate glass that are not exposed (also referred to herein as "unexposed") to such radiation, the silver metal nuclei are not formed. Consequently, crystals of the various ceramic phases may grow to larger sizes in those regions of the glass that are not exposed to the UV radiation, in some embodiments rendering these regions opal—i.e., opaque or, at a minimum, translucent. In some embodiments, the crystallites formed in this unexposed region are at least as large as the wavelength of visible light (400 nm-750 nm). In some embodiments, the crystallites formed in the unexposed region are greater than 1 μm in size. When heated at a temperature of at least about 500° C., a lithium-based glass ceramic comprising a crystalline ceramic phase and a residual glass is formed in those regions of the glass that are not exposed to such radiation.

Depending on the heat treatment temperature, the crystalline ceramic phase in the region of the precursor glass that is not exposed to UV radiation comprises lithium aluminosilicate (LAS, or Virgilite), which has a β-quartz crystal structure, and lithium fluoride (LiF, or Griceite). The LAS phase may be described as a "stuffed β-quartz" phase in which $LiAl_2O_3$ occupies $SiO_2$ sites within the crystal structure. In some embodiments, LAS is the dominant crystal phase; i.e., LAS comprises the majority of the crystalline phases present in the ceramic. The ceramic phase may further comprise LiF. In some embodiments, the LAS phase comprises at least about 50 volume percent of the glass ceramic. The lithium zinc aluminosilicate glass is clear and transparent as made, but, in some embodiments, when not exposed to UV radiation in the 248-360 nm ranges and heat treated ("cerammed"), opalizes when reheated to a temperature of at least about 540° C.

At temperatures below about 540° C., LiF is the only crystallizing phase, whereas both LiF and LAS phases crystallize at higher temperatures. Silver metal nucleates the LiF and either silver metal or LiF nucleates the LAS phase. Unexposed regions, however, are devoid of silver precipitates, and LiF is presumably the nucleating phase for LAS in these regions.

The negatively photosensitive glass and glass ceramic described hereinabove also comprise fluorine. Fluorine not only provides photosensitivity, but also ensures extensive nucleation of the crystal phases in the unexposed region of the precursor glass. Without fluorine, the unexposed regions appear to crystallize in an uncontrolled manner, leading to fracture and crumbling of the material at temperatures of 550° C. or greater.

When exposed to electromagnetic radiation having a wavelength in a range from about 248 nm to about 360 nm and then heated at temperatures of 500° C. or more or, in some embodiments, 550° C. or more, for a period ranging from about 0.5 hours to about 8 hours, about 1 hour to about 8 hours, about 1 hour to about 7 hours, about 1 hour to about 6 hours, about 0.5 hours to about 7 hours, about 0.5 hours to about 6 hours, about 2 hour to about 6 hours, or about 1 hour to about 5 hours, the negatively photosensitive lithium zinc aluminosilicate glass is substantially free of crystalline material of sufficient size (<10 nm) that are detectable by x-ray powder diffraction techniques that are known in the art and routinely used to determine crystal size.

In some embodiments, the negatively photosensitive lithium zinc aluminosilicate glass comprises: from about 60 wt % to about 80 wt % $SiO_2$ (i.e., 60 wt %≤$SiO_2$≤80 wt %); from about 3 wt % to about 12 wt % $Al_2O_3$ (i.e., 3 wt %≤$Al_2O_3$≤12 wt %); from about 2 wt % to about 10 wt % $Li_2O$ (i.e., 2 wt %≤$Li_2O$≤10 wt %); from 0 wt % to about 5 wt % $K_2O$ (i.e., 0 wt %≤$K_2O$≤5 wt %); from greater than 0 wt % to about 10 wt % $F^-$ (i.e., 0 wt %<$F^-$≤10 wt %); from greater than 0 wt % to about 2 wt % $CeO_2$ (i.e., 0 wt %<$CeO_2$≤2 wt %); from greater than 0 wt % to about 2 wt % Ag (i.e., 0 wt %<Ag≤2 wt %); and from greater than 0 wt % to about 10 wt % ZnO (i.e., 0 wt %<ZnO≤10 wt %).

In some embodiments, the negatively photosensitive lithium zinc aluminosilicate glass comprises: from about 66 wt % to about 76 wt % $SiO_2$ (i.e., 66 wt %≤$SiO_2$≤76 wt %); from about 5 wt % to about 9 wt % $Al_2O_3$ (i.e., 5 wt %≤$Al_2O_3$≤9 wt %); from about 5 wt % to about 8 wt % $Li_2O$ (i.e., 5 wt %≤$Li_2O$≤8 wt %); from greater than 0 wt % to about 1 wt % $K_2O$ (i.e., 0 wt %<$K_2O$≤1 wt %); from greater than 0 wt % to about 6 wt % $F^-$ (i.e., 0 wt %<$F^-$≤6 wt %); from greater than 0 wt % to about 0.1 wt % $CeO_2$ (i.e., 0 wt %<$CeO_2$≤0.1 wt %); from greater than 0 wt % to about 0.05 wt % Ag (i.e., 0 wt %<Ag≤0.05 wt %); and from about 6 wt % to about 8 wt % ZnO (i.e., 6 wt %≤ZnO≤8 wt %).

In some embodiments, the negatively photosensitive lithium zinc aluminosilicate glass may comprise from about 6 wt % to about 8 wt % $Li_2O$ (i.e., 6 wt %≤$Li_2O$≤8 wt %). In some embodiments, the photosensitive lithium zinc aluminosilicate glass may comprise from about 0.5 wt % to about 1 wt % $K_2O$ (i.e., 0.5 wt %≤$K_2O$≤1 wt %). In some embodiments, the photosensitive lithium zinc aluminosilicate glass may comprise from about 0.03 wt % to about 0.09 wt % $CeO_2$ (i.e., 0.03 wt %≤$CeO_2$≤0.09 wt %). In some embodiments, the photosensitive lithium zinc aluminosilicate glass may comprise from greater than 0 wt % to about 0.03 wt % Ag (i.e., 0 wt %<Ag≤0.03 wt %). In some embodiments, the photosensitive lithium zinc aluminosilicate glass may comprise from about 2 wt % to about 4 wt % $F^-$ (i.e., 2 wt %≤$F^-$≤4 wt %) or from about 2 wt % to about 3.5 wt % $F^-$ (i.e., 2 wt %≤$F^-$≤3.5 wt %). In some embodiments, the photosensitive lithium zinc aluminosilicate glass may comprise up to about 1.5 wt % $Br^-$ (i.e., 0 wt %≤$Br^-$≤4 wt %), or from about 0.3 wt % to about 1.5 wt % $Br^-$ (i.e., 0.3 wt %≤$Br^-$≤1.5 wt %), or from about 0.3 wt % to about 1.3 wt % $Br^-$ (i.e., 0.3 wt %≤$Br^-$≤1.3 wt %). In some embodiments, the glass is free of bromine.

In some embodiments, the negatively photosensitive lithium zinc aluminosilicate glass may include up to about 0.5, 0.4, 0.3, 0.2, or 0.1 wt % $Na_2O$ (i.e., 0 wt %≤$Na_2O$≤0.5 wt %) and, in some embodiments, is free of $Na_2O$. In some embodiments, the photosensitive lithium zinc aluminosilicate glass is free of at least one of MgO, $P_2O_5$, $TiO_2$, and $ZrO_2$. Non-limiting examples of these negatively photosensitive lithium zinc aluminosilicate glasses are listed in Table 1. Exposure to UV radiation followed by heat treatment at 500° C. or more or, in some embodiments, 550° C. or more leaves the exposed region clear and the surrounding unexposed regions, in some embodiments, hazy or even opalized.

TABLE 1

Compositions of examples of negatively photosensitive lithium zinc aluminosilicate glasses.

| | Example | | | | | |
|---|---|---|---|---|---|---|
| | 1 Wt % | 2 Wt % | 3 Wt % | 4 Wt % | 5 Wt % | 6 Wt % |
| $SiO_2$ | 66.9 | 66.9 | 66.9 | 66.9 | 66.9 | 66.9 |
| $Na_2O$ | 0 | 0 | 0 | 0 | 0 | 0 |
| $K_2O$ | 0.75 | 0.75 | 0.75 | 0.75 | 0.75 | 0.75 |
| ZnO | 6.5 | 6.5 | 6.5 | 6.5 | 6.5 | 6.5 |
| $Br^-$ | 1.26 | 0.63 | 0.32 | 1.26 | 0.63 | 0.32 |
| $Al_2O_3$ | 6.5 | 6.5 | 6.5 | 6.5 | 6.5 | 6.5 |
| $CeO_2$ | 0.037 | 0.037 | 0.037 | 0.037 | 0.037 | 0.074 |
| Ag | 0.03 | 0.03 | 0.03 | 0.03 | 0.03 | 0.03 |
| $Li_2O$ | 6.0 | 6.0 | 6.0 | 6.0 | 6.0 | 6.0 |
| MgO | 0 | 0 | 0 | 0 | 0 | 0 |
| $F^-$ | 3.0 | 3.0 | 3.0 | 2.0 | 2.0 | 2.0 |

| | Example | | | | | | | | |
|---|---|---|---|---|---|---|---|---|---|
| | 7 Wt % | 8 Wt % | 9 Wt % | 10 Wt % | 11 Wt % | 12 Wt % | 13 Wt % | 14 Wt % | 15 Wt % |
| $SiO_2$ | 74.17 | 75.05 | 75.93 | 74.44 | 75.01 | 75.68 | 73.35 | 74.21 | 75.08 |
| $Na_2O$ | 0.76 | 0.77 | 0.78 | 0.76 | 0.77 | 0.78 | 0.75 | 0.76 | 0.77 |
| $K_2O$ | 6.5 | 6.5 | 6.5 | 6.5 | 6.5 | 6.5 | 7.14 | 7.23 | 7.31 |
| ZnO | 0.70 | 0.70 | 0.71 | 0.70 | 0.70 | 0.71 | 0.69 | 0.70 | 0.71 |
| $Br^-$ | 74.17 | 75.05 | 75.93 | 74.44 | 75.01 | 75.68 | 8.63 | 7.08 | 5.50 |
| $Al_2O_3$ | 8.72 | 7.16 | 5.56 | 7.09 | 7.16 | 7.22 | 0.04 | 0.04 | 0.04 |
| $CeO_2$ | 0.04 | 0.04 | 0.04 | 0.04 | 0.08 | 0.04 | 0.03 | 0.03 | 0.03 |
| Ag | 0.03 | 0.03 | 0.03 | 0.03 | 0.03 | 0.03 | 6.06 | 6.61 | 7.18 |
| $Li_2O$ | 6.12 | 6.68 | 7.26 | 6.14 | 6.68 | 7.23 | 0.03 | 0.03 | 0.02 |
| $Na_2O$ | 0.03 | 0.03 | 0.03 | 0.03 | 0.03 | 0.03 | 2.21 | 3.31 | 3.35 |
| $F^-$ | 2.21 | 2.23 | 2.26 | 2.21 | 2.23 | 2.25 | 73.35 | 74.21 | 75.08 |

In other embodiments, the lithium zinc aluminosilicate glass is positively photosensitive; i.e., a region of the material, exposed to ultraviolet radiation having a wavelength in a range from about 248 nm to about 360 nm and later heat treated separately at a first temperature and at a second temperature becomes opalized or translucent, while the unexposed remainder of the material remains clear following such heat treatments. The positively photosensitive lithium zinc aluminosilicate glass may, in some embodiments, be obtained by altering the composition of the negatively photosensitive glass-ceramic or precursor glass, described hereinabove and subjecting the precursor glass to an additional heat treatment.

In some embodiments, the positively photosensitive lithium zinc aluminosilicate glass comprises: from about 65 wt % to about 80 wt % $SiO_2$ (65 wt % ≤ $SiO_2$ ≤ 80 wt %); up to about 1 wt % $K_2O$ (0 wt % ≤ $K_2O$ ≤ 1 wt %); from about 3 wt % to about 12 wt % ZnO (3 wt % ≤ ZnO ≤ 12 wt %); up to about 10 wt % $Br^-$ (0 wt % ≤ $Br^-$ ≤ 10 wt %); from about 5 wt % to about 16 wt % $Al_2O_3$ (5 wt % ≤ $Al_2O_3$ ≤ 16 wt %); from greater than 0 wt % to about 2 wt % $CeO_2$ (0 wt % < $CeO_2$ ≤ 2 wt %); from greater than 0 wt % to about 2 wt % Ag (0 wt % < Ag ≤ 2 wt %); from about 2 wt % to about 14 wt % $Li_2O$ (2 wt % ≤ $Li_2O$ ≤ 14 wt %); up to about 1 wt % $Na_2O$ (0 wt % ≤ $Na_2O$ ≤ 1 wt %); from about 0 wt % to about 5 wt % $F^-$ (0 wt % ≤ $F^-$ ≤ 5 wt %); and up to about 8 wt % $ZrO_2$ (0 wt % ≤ $ZrO_2$ ≤ 8 wt %).

In some embodiments, the positively photosensitive lithium zinc aluminosilicate glass comprises: from about 68 wt % to about 78 wt % $SiO_2$ (68 wt % ≤ $SiO_2$ ≤ 78 wt %); up to about 1 wt % $K_2O$ (0 wt % ≤ $K_2O$ ≤ 1 wt %); from about 5 wt % to about 10 wt % ZnO (5 wt % ≤ ZnO ≤ 10 wt %); up to about 10 wt % $Br^-$ (0 wt % ≤ $Br^-$ ≤ 10 wt %); from about 5 wt % to about 14 wt % $Al_2O_3$ (5 wt % ≤ $Al_2O_3$ ≤ 14 wt %); from about 0.01 wt % to about 0.07 wt % $CeO_2$ (0.01 wt % ≤ $CeO_2$ ≤ 0.07 wt %); from about 0.01 wt % to about 0.05 wt % Ag (0.01 wt % ≤ Ag ≤ 0.05 wt %); from about 5 wt % to about 10 wt % $Li_2O$ (5 wt % ≤ $Li_2O$ ≤ 10 wt %); up to about 1 wt % $Na_2O$ (0 wt % ≤ $Na_2O$ ≤ 1 wt %); from about 0 wt % to about 3 wt % $F^-$ (0 wt % ≤ $F^-$ ≤ 3 wt %); and up to about 5 wt % $ZrO_2$ (0 wt % ≤ $ZrO_2$ ≤ 5 wt %).

In some embodiments, the positively photosensitive lithium zinc aluminosilicate precursor glass may be produced by adding $ZrO_2$ to the negatively photosensitive lithium zinc aluminosilicate composition. Non-limiting examples of these glasses are listed in Table 2 below. Example 16 in Table 2 is an exemplary composition of the photonegative glass ceramic and glass. In these embodiments, the positively photosensitive lithium zinc aluminosilicate glass comprises: from about 72 wt % to about 76 wt % $SiO_2$ (72 wt % ≤ $SiO_2$ ≤ 76 wt %); from about 0.5 wt % to about 1 wt % $K_2O$ (0.5 wt % ≤ $K_2O$ ≤ 1 wt %); from about 5 wt % to about 7 wt % ZnO (5 wt % ≤ ZnO ≤ 7 wt %); from about 0.5 wt % to about 0.8 wt % $Br^-$ (0.5 wt % ≤ $Br^-$ ≤ 0.8 wt %); from about 6 wt % to about 8 wt % $Al_2O_3$ (6 wt % ≤ $Al_2O_3$ ≤ 8 wt %); from about 0.01 wt % to about 0.04 wt % $CeO_2$ (0.01 wt % ≤ $CeO_2$ ≤ 0.04 wt %); from about 0.03 wt % to about 0.05 wt % Ag (0.03 wt % ≤ Ag ≤ 0.05 wt %); from about 6 wt % to about 8 wt % $Li_2O$ (6 wt % ≤ $Li_2O$ ≤ 8 wt %); up to about 0.05 wt % $Na_2O$ (0 wt % ≤ $Na_2O$ ≥ 0.05 wt %); from about 2 wt % to about 3 wt % $F^-$ (2 wt % ≤ $F^-$ ≤ 3 wt %); and from about 0.5 wt % to about 5 wt % $ZrO_2$ (0.5 wt % ≤ $ZrO_2$ ≤ 5 wt %).

Figure 2:
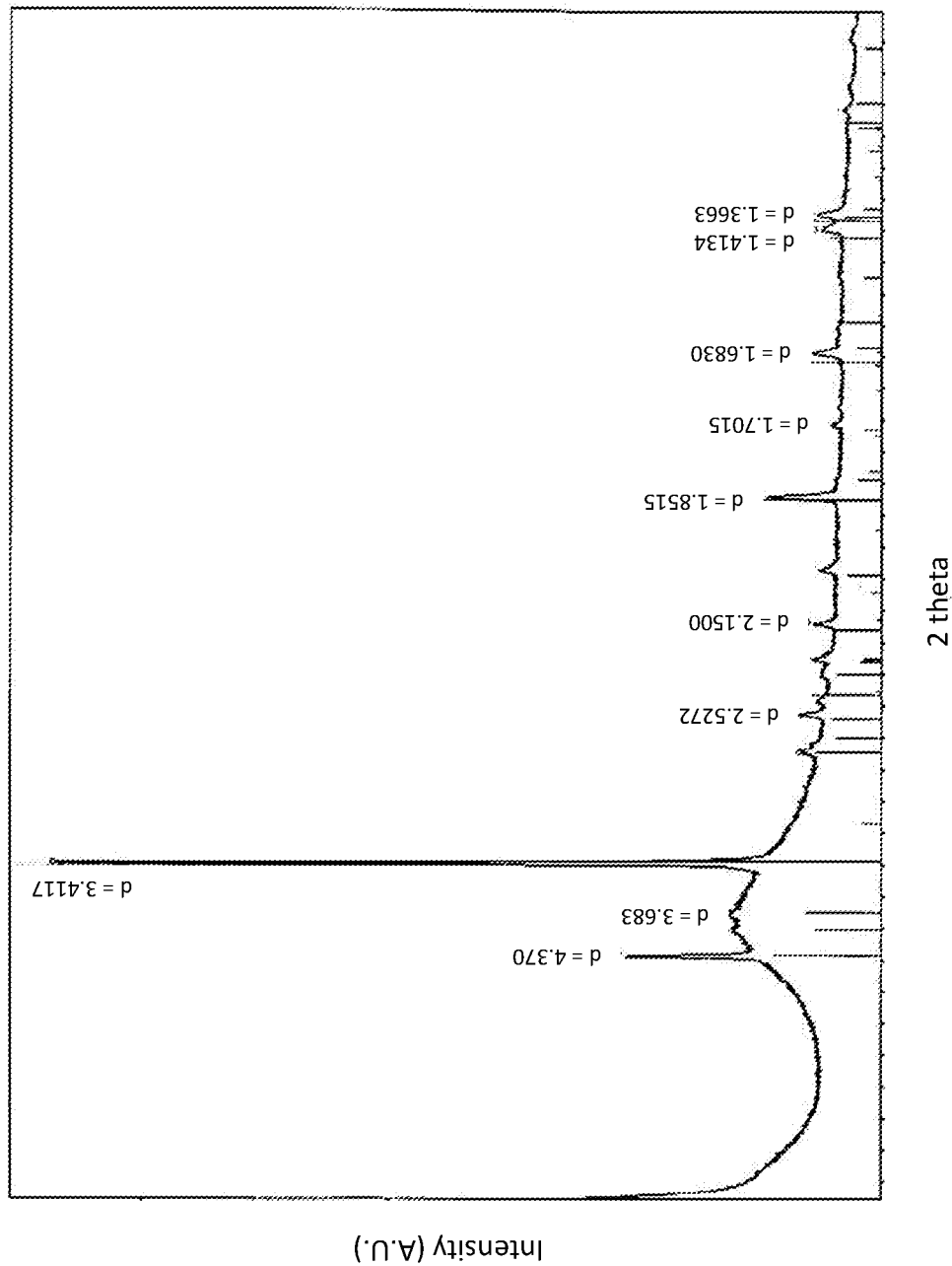
FIG. 2 is an x-ray diffraction pattern obtained for an opalized portion of a sample that was exposed to UV radiation, heat treated first at 575° C. for two hours, cooled to room temperature, and then heat treated at 575° C. for two hours.

FIG. 1 is a photograph of samples in which $ZrO_2$ was added to the negatively photosensitive lithium zinc aluminosilicate precursor glass composition. The resulting glasses are positively photosensitive, with the opalized ceramic phase present in those portions of the samples that were exposed to UV radiation and a lithium zinc aluminosilicate glass phase present in those portions of the samples that were not exposed to UV radiation. Samples A and B each have composition 19 (containing 2.92 wt % $ZrO_2$) and samples C, D, and E each have composition 20 (containing 3.85 wt % $ZrO_2$) listed in Table 2. Heat treatment times and temperatures that were used to form the lithium-based glass ceramics in examples 19 and 20 are listed in Table 2A. Exposed portions 110 of samples A-E in FIG. 1 are opalized while unexposed portions 120 remain clear. X-Ray diffraction (XRD) analysis of the opalized material indicates the presence of a virgilite Li-aluminosilicate phase. FIG. 2 is a XRD pattern obtained for an opalized portion of a sample having composition 18 that was exposed to UV radiation, subsequently heat treated first at 575° C. for two hours, cooled to room temperature, and then heat treated again at 575° C. for two hours. The XRD pattern shows that the dominant phase has the stuffed β-quartz Li-aluminosilicate (virgilite $Li_xAl_xSi_{3-x}O_8$) crystal structure.

TABLE 2

Compositions of positively photosensitive lithium zinc aluminosilicate precursor glasses in which ZrO$_2$ was added to a negatively photosensitive lithium zinc aluminosilicate glass composition.

| Example | 16 Wt % | 17 Wt % | 18 Wt % | 19 Wt % | 20 Wt % |
|---|---|---|---|---|---|
| SiO$_2$ | 75.68 | 75.04 | 74.19 | 73.46 | 72.76 |
| K$_2$O | 0.77 | 0.77 | 0.76 | 0.76 | 0.76 |
| ZnO | 6.04 | 5.99 | 5.91 | 5.85 | 5.80 |
| Br– | 0.71 | 0.57 | 0.69 | 0.69 | 0.68 |
| Al$_2$O$_3$ | 7.22 | 7.15 | 7.09 | 7.01 | 6.94 |
| CeO$_2$ | 0.03 | 0.03 | 0.03 | 0.03 | 0.03 |
| Ag | 0.04 | 0.04 | 0.04 | 0.04 | 0.04 |
| Li$_2$O | 7.23 | 7.17 | 7.09 | 7.02 | 6.95 |
| Na$_2$O | 0.03 | 0.03 | 0.03 | 0.03 | 0.03 |
| F– | 2.25 | 2.23 | 2.21 | 2.18 | 2.16 |
| ZrO$_2$ | 0.00 | 0.99 | 1.96 | 2.92 | 3.85 |

TABLE 2A

Heat treatment times and temperatures for glass ceramic samples shown in FIG. 1.

| FIG. 1 | Example/ composition | First heat treatment | Second heat treatment |
|---|---|---|---|
| A | 20 | 2 hours at 550° | 2 hours at 650° |
| B | 20 | 2 hours at 550° | 2 hours at 600° |
| C | 19 | 2 hours at 675° | 2 hours at 675° |
| D | 19 | 2 hours at 675° | 2 hours at 675° |
| E | 19 | 2 hours at 650° | 2 hours at 650° |

Figure 3:
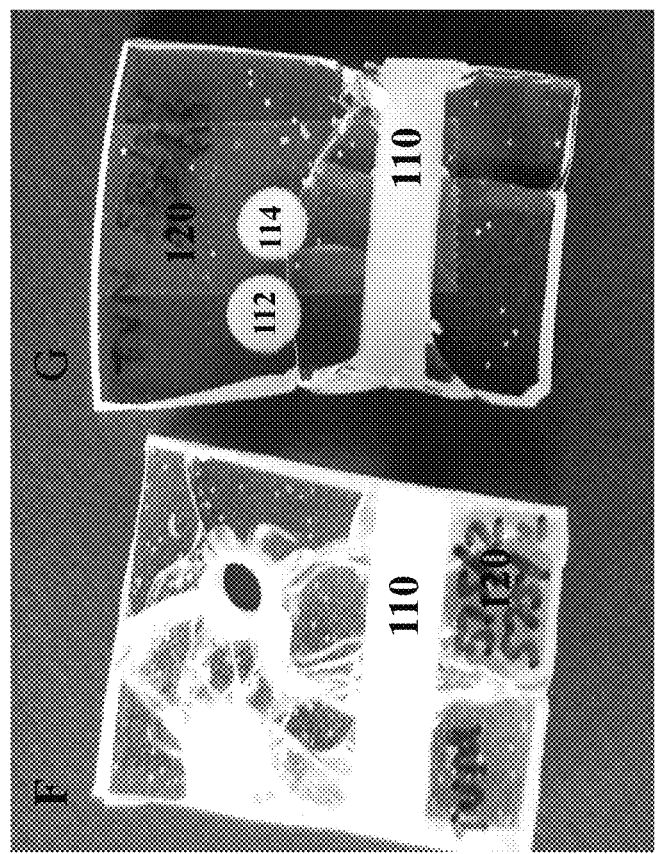
FIG. 3 is a photograph of two samples following exposure to ultraviolet radiation, and heat treatments at a first temperature and a second temperature.

In other embodiments, the positively photosensitive lithium zinc aluminosilicate precursor glass is produced by increasing the alumina content relative to that of SiO$_2$ in the negatively photosensitive lithium aluminosilicate composition. In these embodiments, the positively photosensitive precursor glass comprises: from about 68 wt % to about 76 wt % SiO$_2$ (68 wt %≤SiO$_2$≤76 wt %); from about 0.5 wt % to about 1 wt % K$_2$O (0.5 wt %≤K$_2$O≤1 wt %); from about 5 wt % to about 8 wt % ZnO (5 wt %≤ZnO≤8 wt %); from about 0.5 wt % to about 1.0 wt % Br$^-$ (0.5 wt %≤Br$^-$≤1.0 wt %); from about 7 wt % to about 14 wt % Al$_2$O$_3$ (7 wt %≤Al$_2$O$_3$≤12 wt %); from about 0.01 wt % to about 0.07 wt % CeO$_2$ (0.01 wt %≤CeO$_2$≤0.07 wt %); from about 0.03 wt % to about 0.05 wt % Ag (0.03 wt %≤Ag≤0.05 wt %); from about 7 wt % to about 9 wt % Li$_2$O (7 wt %≤Li$_2$O≤9 wt %); up to about 0.05 wt % Na$_2$O (0 wt %≤Na$_2$O≤0.05 wt %); and from about 2 wt % to about 3 wt % F— (2 wt %≤F—≤3 wt %). Non-limiting examples of these glasses and glass-ceramics are listed in Table 3 below. The alumina content in examples 21 and 22 were increased by 2 wt % and 4 wt %, respectively, relative to the composition of reference example 16, listed in Table 1. Example 21 was first heated at 575° C. for two hours and then cooled to room temperature (about 25° C.) and later heated at 575° C. for two hours, whereas example 22 was first heated at 550° C. for two hours and then cooled to room temperature and later heated at 575° C. for two hours. FIG. 3 is a photograph of samples of examples 21 (F in FIG. 3) and 22 (G in FIG. 3) following irradiation and heat treatments. Both samples have opalized regions 110—and, in sample G, 112 and 114—where exposed to UV radiation. The XRD pattern obtained for example 22/sample G indicates that the major phase in the opalized regions has the "stuffed β-quartz" lithium-aluminosilicate (virgilite) Li$_x$Al$_x$Si$_{3-x}$O$_8$ crystal structure.

TABLE 3

Compositions of positively photosensitive lithium zinc aluminosilicate precursor glasses in which alumina content is increased relative to that of SiO$_2$.

| | Example | | | | | |
|---|---|---|---|---|---|---|
| | 21 Wt % | 22 Wt % | 23 Wt % | 24 Wt % | 25 Wt % | 26 Wt % |
| SiO$_2$ | 73.89 | 72.14 | 73.80 | 71.98 | 70.11 | 68.31 |
| K$_2$O | 0.77 | 0.76 | 0.78 | 0.81 | 0.87 | 0.92 |
| ZnO | 5.99 | 5.94 | 6.56 | 7.02 | 7.46 | 7.93 |
| Br– | 0.71 | 0.70 | 0.72 | 0.76 | 0.82 | 0.87 |
| Al$_2$O$_3$ | 9.14 | 11.04 | 7.85 | 8.41 | 9.02 | 9.51 |
| CeO$_2$ | 0.03 | 0.03 | 0.03 | 0.03 | 0.06 | 0.06 |
| Ag | 0.04 | 0.04 | 0.04 | 0.04 | 0.04 | 0.04 |
| Li$_2$O | 7.17 | 7.11 | 7.77 | 8.32 | 8.84 | 9.39 |
| Na$_2$O | 0.03 | 0.03 | 0.03 | 0.03 | 0.03 | 0.03 |
| F– | 2.23 | 2.21 | 2.42 | 2.59 | 2.75 | 2.93 |
| ZrO$_2$ | 0.00 | 0.00 | | | | |

Figure 4:
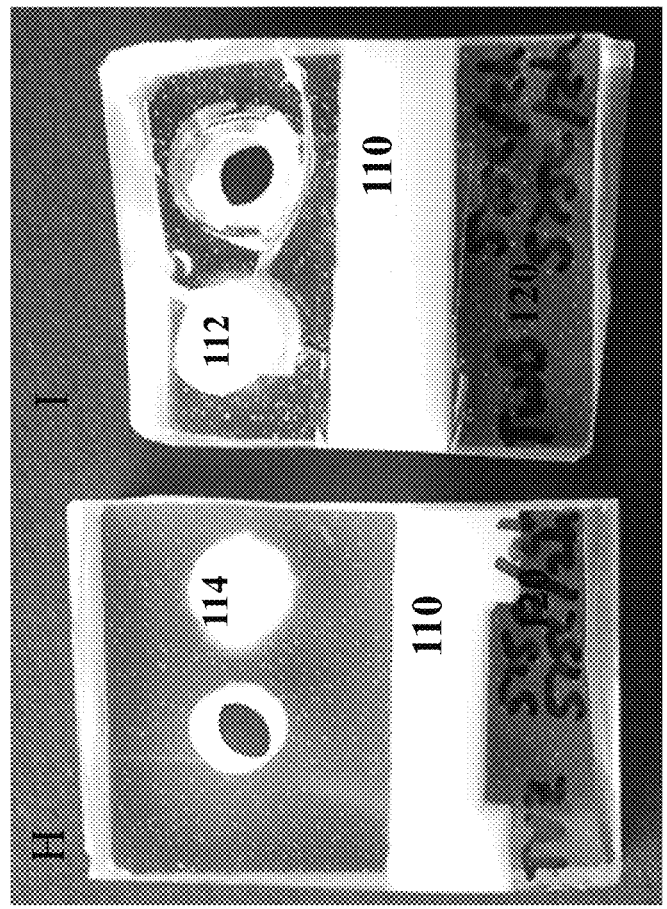
FIG. 4 is a photograph of two samples following exposure to ultraviolet radiation, and heat treatments at a first temperature and a second temperature.

While ZnO is a constituent of the negatively photosensitive glass-ceramic and precursor glasses, a positively photosensitive glass-ceramic and precursor glass may be obtained by increasing the ZnO concentration relative to the alumina and silica content in the negatively photosensitive lithium aluminosilicate composition. In these embodiments, the positively photosensitive glass precursor glass comprises: from about 68 wt % to about 77 wt % SiO$_2$ (68 wt %≤SiO$_2$≤77 wt %); from about 0.5 wt % to about 1 wt % K$_2$O (0.5 wt %≤K$_2$O≤1 wt %); from about 6 wt % to about 10 wt % ZnO (6 wt %≤ZnO≤10 wt %); from about 0.5 wt % to about 1.0 wt % Br$^-$ (0.5 wt %≤Br$^-$≤1 wt %); from about 7 wt % to about 10 wt % Al$_2$O$_3$ (7 wt %≤Al$_2$O$_3$≤10 wt %); from about 0.02 wt % to about 0.05 wt % CeO$_2$ (0.02 wt %≤CeO$_2$≤0.05 wt %); from about 0.02 wt % to about 0.05 wt % Ag (0.03 wt %≤Ag≤0.05 wt %); from about 7 wt % to about 10 wt % Li$_2$O (7 wt %≤Li$_2$O≤10 wt %); up to about 0.05 wt % Na$_2$O (0 wt %≤Na$_2$O≤0.05 wt %); from about 1 wt % to about 3 wt % F$^-$ (1 wt %≤F$^-$≤3 wt %), and up to about 4 wt % ZrO$_2$ (0 wt %≤ZrO$_2$≤4 wt %). Compositions of non-limiting examples of these positively photosensitive lithium zinc aluminosilicate glasses are listed in Table 4 below. The glass-ceramic may, in some embodiments, be obtained by first exposing the positively photosensitive precursor glass to ultraviolet light followed by a first heat treatment at about 575° C. for two hours, then cooling the precursor glass to room temperature (about 25° C.) and later heating the precursor glass at about 575° C. for two hours to form the glass ceramic. FIG. 4 is a photograph of samples of examples 28 (H in FIG. 4) and 30 (I in FIG. 4) following irradiation and heat treatments. Both samples have opalized region 110—and, in sample H, 114, and in sample I, 112—where the material was exposed to UV radiation. The XRD pattern obtained for examples 30/sample I (FIG. 4) indicates that the major phase in the opalized regions has the "stuffed β-quartz" lithium-aluminosilicate (virgilite) Li$_x$Al$_x$Si$_{3-x}$O$_8$ crystal structure.

TABLE 4

Compositions of positively photosensitive lithium zinc aluminosilicate precursor glasses in which the ZnO concentration is increased relative to the alumina and SiO$_2$ content.

| Example | TVY Wt % | TVZ Wt % | TWA Wt % | TWB Wt % | TWC Wt % |
|---|---|---|---|---|---|
| SiO$_2$ | 73.84 | 73.19 | 72.89 | 76.20 | 70.97 |
| K$_2$O | 0.77 | 0.78 | 0.79 | 0.79 | 0.74 |

TABLE 4-continued

Compositions of positively photosensitive
lithium zinc aluminosilicate precursor
glasses in which the ZnO concentration is
increased relative to the alumina and SiO$_2$ content.

| Example | TVY Wt % | TVZ Wt % | TWA Wt % | TWB Wt % | TWC Wt % |
|---|---|---|---|---|---|
| ZnO | 6.56 | 9.05 | 7.45 | 6.16 | 6.31 |
| Br– | 0.72 | 0.71 | 0.70 | 0.70 | 0.69 |
| Al$_2$O$_3$ | 7.86 | 7.02 | 8.96 | 7.36 | 7.55 |
| CeO$_2$ | 0.04 | 0.04 | 0.04 | 0.04 | 0.04 |
| Ag | 0.03 | 0.03 | 0.03 | 0.03 | 0.03 |
| Li$_2$O | 7.77 | 7.77 | 8.32 | 8.84 | 9.39 |
| Na$_2$O | 0.03 | 0.03 | 0.03 | 0.03 | 0.03 |
| F– | 2.25 | 2.18 | 2.17 | 1.84 | 2.33 |
| ZrO$_2$ | 0 | 0 | 0 | 0 | 3.84 |

In other embodiments, the positively photosensitive lithium zinc aluminosilicate precursor glasses may be obtained by replacing fluorine with bromine. In such embodiments, the precursor glass may comprise up to about 10 wt % or, in some embodiments, up to about 1 wt % Br–. In these embodiments, the positively photosensitive lithium zinc aluminosilicate precursor glass may comprise: from about 70 wt % to about 78 wt % SiO$_2$ (70 wt %≤SiO$_2$≤78 wt %); from about 0.5 wt % to about 1 wt % K$_2$O (0.5 wt %≤K$_2$O≤1 wt %); from about 5 wt % to about 7 wt % ZnO (5 wt %≤ZnO≤7 wt %); from about 0 wt % to about 10 wt % Br– (0.5 wt %≤Br–≤10 wt %); from about 6 wt % to about 8 wt % Al$_2$O$_3$ (6 wt %≤Al$_2$O$_3$≤8 wt %); from about 0.02 wt % to about 0.05 wt % CeO$_2$ (0.02 wt %≤CeO$_2$≤0.05 wt %); from about 0.02 wt % to about 0.05 wt % Ag (0.02 wt %≤Ag≤0.05 wt %); from about 6 wt % to about 8 wt % Li$_2$O (6 wt %≤Li$_2$O≤8 wt %); up to about 1 wt % Na$_2$O (0 wt %≤Na$_2$O≤1 wt %); and from 0 wt % to about 3 wt % F– (0 wt %≤F–≤3 wt %). Non-limiting examples of these glasses and glass-ceramics are listed in Table 5 below. The XRD patterns obtained for samples having the composition listed for example 34 indicate that the major phase in the opalized regions has the "stuffed β-quartz" lithium-aluminosilicate (virgilite) Li$_x$Al$_x$Si$_{3-x}$O$_8$ crystal structure. Although these samples were heat treated at different temperatures, no discernable difference in the XRD data was observed.

TABLE 5

Compositions of positively photosensitive lithium zinc
aluminosilicate precursor glasses in which fluorine is replaced by bromine.

| | Example | | | | | | |
|---|---|---|---|---|---|---|---|
| | 32 Wt % | 33 Wt % | 34 Wt % | 35 Wt % | 36 Wt % | 37 Wt % | 38 Wt % |
| SiO$_2$ | 77.98 | 77.36 | 76.75 | 73.00 | 72.45 | 71.91 | 70.58 |
| K$_2$O | 0.80 | 0.79 | 0.79 | 0.75 | 0.74 | 0.74 | 0.72 |
| ZnO | 6.21 | 6.16 | 6.11 | 5.82 | 5.77 | 5.73 | 5.62 |
| Br– | 0 | 0 | 0 | 6.40 | 6.35 | 6.30 | 9.50 |
| Al$_2$O$_3$ | 7.44 | 7.38 | 7.32 | 6.96 | 6.91 | 6.86 | 6.73 |
| CeO$_2$ | 0.04 | 0.04 | 0.04 | 0.04 | 0.04 | 0.04 | 0.04 |
| Ag | 0.03 | 0.03 | 0.03 | 0.03 | 0.03 | 0.03 | 0.03 |
| Li$_2$O | 7.45 | 7.39 | 7.33 | 6.98 | 6.92 | 6.87 | 6.74 |
| Na$_2$O | 0.80 | 0.79 | 0.79 | 0.75 | 0.74 | 0.03 | 0.03 |
| F– | 0 | 0.78 | 1.59 | 0 | 0.75 | 1.49 | 0 |

In another aspect, a composite glass article comprising a lithium-based glass ceramic and a photosensitive lithium zinc aluminosilicate glass is provided. The composite glass article comprises a first region and a second region. The first region comprises a lithium-based glass ceramic comprising a ceramic phase and a residual glass phase. The ceramic phase comprises a lithium aluminosilicate (LAS) phase having a lithium aluminosilicate stuffed β-quartz structure, such as described hereinabove. In some embodiments, the lithium-based glass ceramic is free of at least one of Na$_2$O, MgO, P$_2$O$_5$, TiO$_2$, ZrO$_2$, or bromine. In some embodiments, the LAS phase comprises at least about 50 volume percent of the glass ceramic region.

The second region comprises a lithium zinc aluminosilicate glass that is photosensitive to ultraviolet radiation having a wavelength in a range from about 248 nm to about 360 nm, such as those described hereinabove. The lithium zinc aluminosilicate glass comprises at least one sensitizing agent and at least one nucleating agent. In some embodiments, the at least one sensitizing agent may include, but is not limited to, at least one of silver or cerium. The at least one nucleating agent may include, but is not limited to, silver and/or at least one halogen or halide. In some embodiments, the at least one nucleating agent comprises at least one of fluorine, chlorine, or bromine. In particular embodiments, the at least one nucleating agent comprises fluorine or bromine.

In some embodiments, the first region is opaque or translucent. In some embodiments, the lithium zinc aluminosilicate glass is transparent.

In some embodiments, the lithium zinc aluminosilicate glass is negatively photosensitive with respect to the ultraviolet radiation; i.e., a region of the glass exposed to ultraviolet radiation and subsequently heat treated or cerammed remains clear, while the remainder of the material that is not exposed to, or shielded from, such radiation and heat treated becomes opalized or translucent when heat treated or cerammed. In those embodiments in which the second region comprises a negatively photosensitive lithium zinc aluminosilicate glass, the first region, which comprises the lithium-based glass ceramic, is not exposed (i.e., is "unexposed") to UV radiation.

In some embodiments, the negatively photosensitive lithium zinc aluminosilicate glass comprises: from about 66 wt % to about 76 wt % SiO$_2$ (i.e., 66 wt %≤SiO$_2$ 76 wt %); from about 5 wt % to about 9 wt % Al$_2$O$_3$ (i.e., 5 wt %≤Al$_2$O$_3$≤9 wt %); from about 5 wt % to about 8 wt % Li$_2$O (i.e., 5 wt %≤Li$_2$O≤8 wt %); from greater than 0 wt % to about 1 wt % K$_2$O (i.e., 0 wt %<K$_2$O≤1 wt %); from greater than 0 wt % to about 6 wt % F– (i.e., 0 wt %<F–≤6 wt %); from greater than 0 wt % to about 0.1 wt % CeO$_2$ (i.e., 0 wt %<CeO$_2$≤0.1 wt %); from greater than 0 wt % to about 0.05 wt % Ag (i.e., 0 wt %<Ag≤0.05 wt %); and from about 6 wt % to about 8 wt % ZnO (i.e., 6 wt %≤ZnO≤8 wt %).

In other embodiments, the second region comprises a positively photosensitive lithium zinc aluminosilicate glass; i.e., a region of the glass, exposed to ultraviolet radiation having a wavelength in a range from about 248 nm to about 360 nm becomes opalized or translucent when later heat treated separately at a first temperature and at a second temperature, while the unexposed remainder of the material remains clear following such heat treatments. These positively photosensitive glasses have been previously described hereinabove, and comprise: from about 68 wt % to about 78 wt % SiO$_2$ (68 wt %≤SiO$_2$≤78 wt %); up to about 1 wt % K$_2$O (0 wt %≤K$_2$O≤1 wt %); from about 5 wt % to about 10 wt % ZnO (4 wt %≤ZnO≤8 wt %); up to about 10 wt % Br– (0 wt %≤Br–≤10 wt %); from about 5 wt % to about 14 wt % Al$_2$O$_3$ (5 wt %≤Al$_2$O$_3$≤12 wt %); from about 0.01 wt % to about 0.07 wt % CeO$_2$ (0.01 wt %≤CeO$_2$≤0.07 wt %); from about 0.01 wt % to about 0.05 wt % Ag (0.01 wt %≤Ag≤0.05 wt %); from about 5 wt % to about 10 wt %

Li$_2$O (5 wt %≤Li$_2$O≤10 wt %); up to about 1 wt % Na$_2$O (0 wt %≤Na$_2$O≤1 wt %); from about 0 wt % to about 3 wt % F$^-$ (0 wt %≤F$^-$≤3 wt %); and up to about 5 wt % ZrO$_2$ (0 wt %≤ZrO$_2$≤5 wt %).

In some embodiments, the positively photosensitive lithium zinc aluminosilicate glass comprises: from about 72 wt % to about 76 wt % SiO$_2$ (72 wt %≤SiO$_2$≤76 wt %); from about 0.5 wt % to about 1 wt % K$_2$O (0.5 wt %≤K$_2$O≤1 wt %); from about 5 wt % to about 7 wt % ZnO (5 wt %≤ZnO≤7 wt %); from about 0.5 wt % to about 0.8 wt % Br$^-$ (0.5 wt %≤Br$^-$≤0.8 wt %); from about 6 wt % to about 8 wt % Al$_2$O$_3$ (6 wt %≤Al$_2$O$_3$≤8 wt %); from about 0.01 wt % to about 0.04 wt % CeO$_2$ (0.01 wt %≤CeO$_2$≤0.04 wt %); from about 0.03 wt % to about 0.05 wt % Ag (0.03 wt %≤Ag≤0.05 wt %); from about 6 wt % to about 8 wt % Li$_2$O (6 wt %≤Li$_2$O≤8 wt %); up to about 0.05 wt % Na$_2$O (0 wt %≤Na$_2$O≤0.05 wt %); from about 2 wt % to about 3 wt % F$^-$ (2 wt %≤F$^-$≤3 wt %); and from about 0.5 wt % to about 5 wt % ZrO$_2$ (0.5 wt %≤ZrO$_2$≤5 wt %).

In some embodiments, the positively photosensitive lithium zinc aluminosilicate glass comprises: from about 68 wt % to about 76 wt % SiO$_2$ (68 wt %≤SiO$_2$≤76 wt %); from about 0.5 wt % to about 1 wt % K$_2$O (0.5 wt %≤K$_2$O≤1 wt %); from about 5 wt % to about 8 wt % ZnO (5 wt %≤ZnO≤8 wt %); from about 0.5 wt % to about 1.0 wt % Br$^-$ (0.5 wt %≤Br$^-$≤1.0 wt %); from about 7 wt % to about 14 wt % Al$_2$O$_3$ (7 wt %≤Al$_2$O$_3$≤12 wt %); from about 0.01 wt % to about 0.07 wt % CeO$_2$ (0.01 wt %≤CeO$_2$≤0.07 wt %); from about 0.03 wt % to about 0.05 wt % Ag (0.03 wt %≤Ag≤0.05 wt %); from about 7 wt % to about 9 wt % Li$_2$O (7 wt %≤Li$_2$O≤9 wt %); up to about 0.05 wt % Na$_2$O (0 wt %≤Na$_2$O≤0.05 wt %); and from about 2 wt % to about 3 wt % F$^-$ (2 wt %≤F$^-$≤3 wt %).

In some embodiments, the positively photosensitive lithium zinc aluminosilicate glass comprises: from about 68 wt % to about 77 wt % SiO$_2$ (68 wt %≤SiO$_2$≤77 wt %); from about 0.5 wt % to about 1 wt % K$_2$O (0.5 wt %≤K$_2$O≤1 wt %); from about 6 wt % to about 10 wt % ZnO (6 wt %≤ZnO≤10 wt %); from about 0.5 wt % to about 1.0 wt % Br$^-$ (0.5 wt %≤Br$^-$≤1 wt %); from about 7 wt % to about 10 wt % Al$_2$O$_3$ (7 wt %≤Al$_2$O$_3$≤10 wt %); from about 0.02 wt % to about 0.05 wt % CeO$_2$ (0.02 wt %≤CeO$_2$≤0.05 wt %); from about 0.02 wt % to about 0.05 wt % Ag (0.03 wt %≤Ag≤0.05 wt %); from about 7 wt % to about 10 wt % Li$_2$O (7 wt %≤Li$_2$O≤10 wt %); up to about 0.05 wt % Na$_2$O (0 wt %≤Na$_2$O≤0.05 wt %); from about 1 wt % to about 3 wt % F$^-$ (1 wt %≤F$^-$≤3 wt %), and up to about 4 wt % ZrO$_2$ (0 wt %≤ZrO$_2$≤4 wt %).

In some embodiments, the positively photosensitive lithium zinc aluminosilicate glass comprises: from about 70 wt % to about 78 wt % SiO$_2$ (70 wt %≤SiO$_2$≤78 wt %); from about 0.5 wt % to about 1 wt % K$_2$O (0.5 wt %≤K$_2$O≤1 wt %); from about 5 wt % to about 7 wt % ZnO (5 wt %≤ZnO≤7 wt %); from about 0 wt % to about 10 wt % Br$^-$ (0.5 wt %≤Br$^-$≤10 wt %); from about 6 wt % to about 8 wt % Al$_2$O$_3$ (6 wt %≤Al$_2$O$_3$≤8 wt %); from about 0.02 wt % to about 0.05 wt % CeO$_2$ (0.02 wt %≤CeO$_2$≤0.05 wt %); from about 0.02 wt % to about 0.05 wt % Ag (0.02 wt %≤Ag≤0.05 wt %); from about 6 wt % to about 8 wt % Li$_2$O (6 wt %≤Li$_2$O≤8 wt %); up to about 1 wt % Na$_2$O (0 wt %≤Na$_2$O≤1 wt %); and from 0 wt % to about 3 wt % F$^-$ (0 wt %≤F$^-$≤3 wt %).

In some embodiments, the first region (the lithium-based glass ceramic) and the second region (the lithium zinc aluminosilicate glass) of the composite glass articles described herein may be randomly dispersed throughout the composite glass article. In other embodiments, the first region and second region are spatially separate from each other.

In some embodiments, the first region (the lithium-based glass ceramic) and the second region (the lithium zinc aluminosilicate glass) of the composite glass articles described herein may be arranged in an array. The array may, in some embodiments, be a regular, repeated pattern, which may be either short range (i.e., having/extending in a dimension of up to about 1 mm or less) or long range (i.e., having a dimension/extending in a dimension of greater than 1 mm). Such an array may be formed by selectively irradiating portions of the precursor glass with UV light in a predetermined pattern, or by shielding a portion of the precursor glass from the UV light.

In some embodiments, the lithium-based glass ceramic has a thermal expansion $\Delta L_1/L_1$ and the lithium zinc aluminosilicate glass has a thermal expansion $\Delta L_2/L_2$ measured between room temperature and a second temperature T, wherein 25° C.≤T≤300° C., where $\Delta L_i$ is the change in dimension $L_i$ of the lithium-based glass ceramic and the lithium zinc aluminosilicate glass over the temperature range measured. This thermal expansion differential places the lithium zinc aluminosilicate glass in tension and the lithium-based glass ceramic in compression at the boundary between the glass and ceramic phases, thereby increasing the mechanical strength of the composite glass article.

Figure 5A:
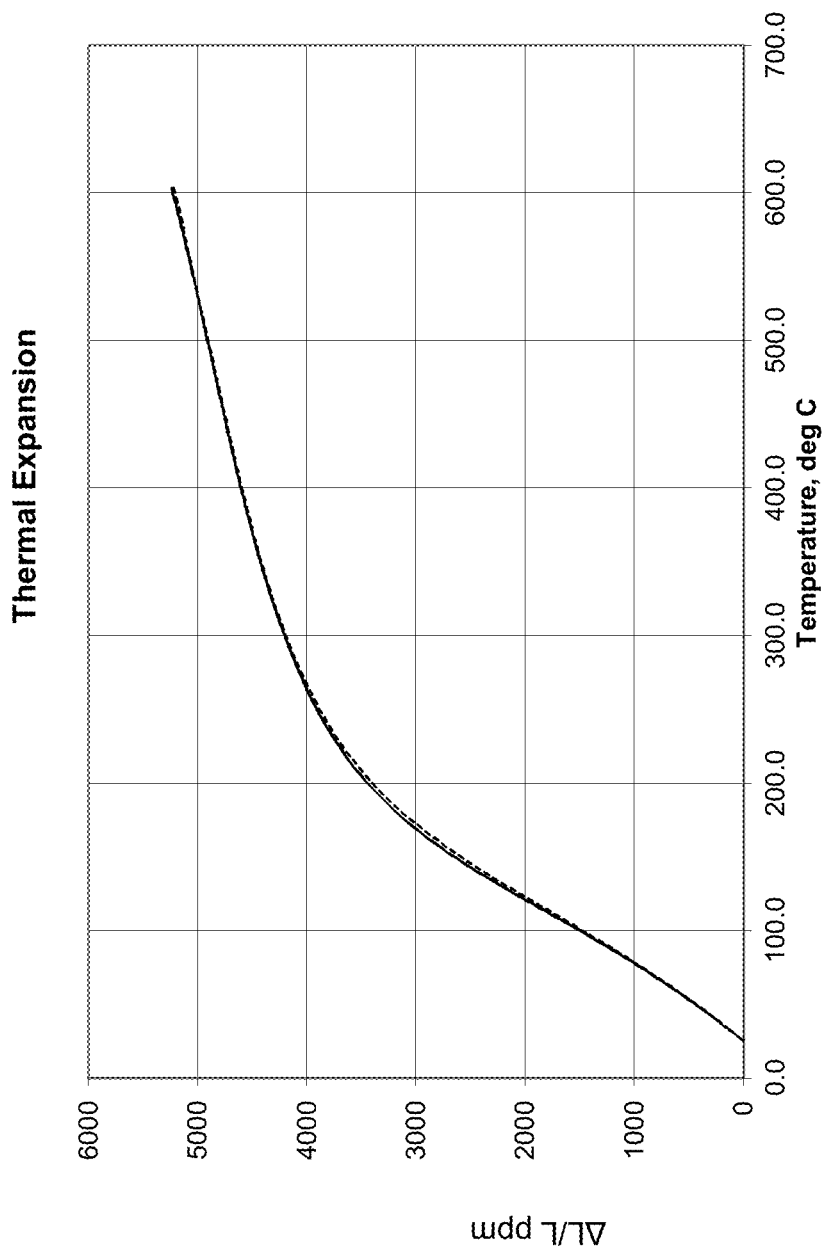
FIG. 5A is a plot of thermal expansion as function of temperature for the lithium-based glass ceramic of the composite glass article described herein.
Figure 5B:
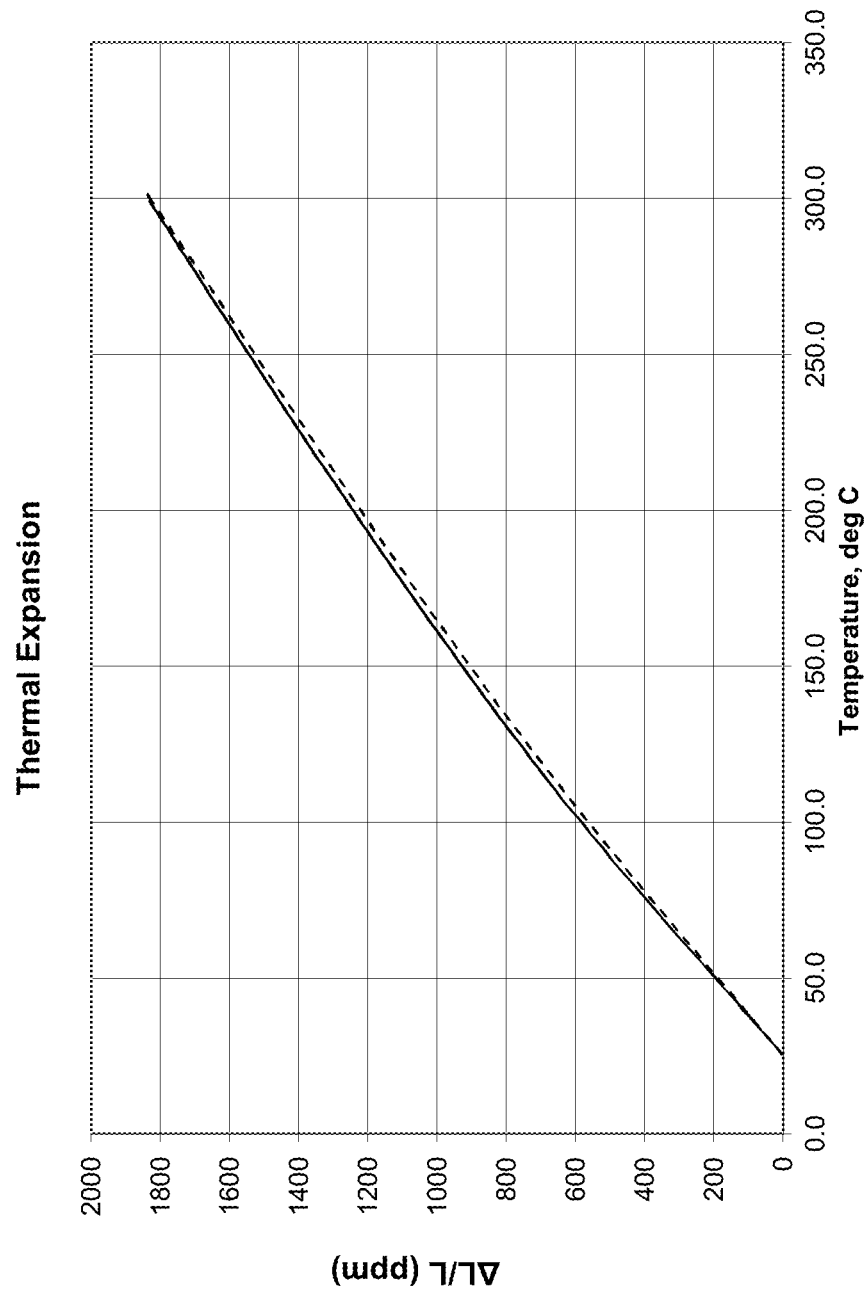
FIG. 5B is a plot of thermal expansion as function of temperature for the lithium zinc aluminosilicate glass described herein.

Thermal expansion of the lithium-based glass ceramic and the lithium zinc aluminosilicate glass of the composite glass article are plotted as function of temperature in FIGS. 5A and 5B, respectively. As seen in FIGS. 5A and 5B, the lithium-based glass ceramic undergoes a 0.6% decrease in volume as it cools from the thermal development temperature of 600° C., whereas the lithium zinc aluminosilicate glass undergoes a 0.3% decrease in volume upon cooling from the thermal development temperature. Thus volume of the lithium-based glass ceramic experiences a 50% greater volume decrease relative to the lithium zinc aluminosilicate glass, which results in a build-up of compressive stress in the lithium-based glass ceramic and tensile stress in the lithium zinc aluminosilicate glass at the boundary of the glass ceramic/glass interface. The nature of the compressive and tensile stresses that develop under this condition provides a stress region that is capable of deflecting a propagating crack.

Figure 6:
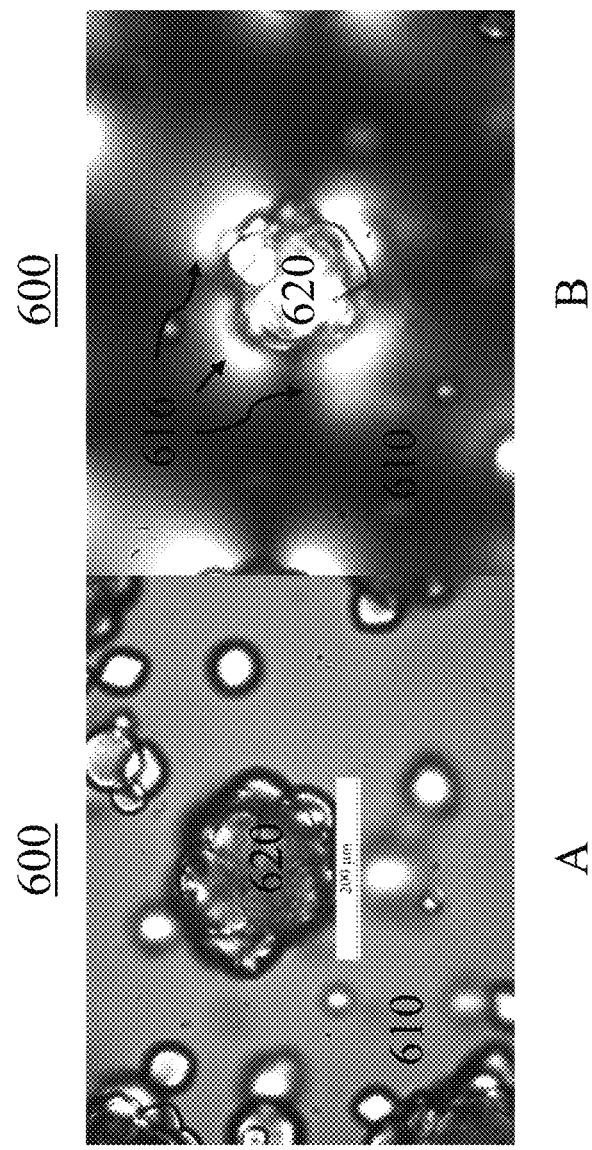
FIG. 6 shows a microscopic image of a composite glass article viewed under non-polarized light (A) and under polarized light (B)

The induced stress between the lithium-based glass ceramic and the lithium zinc aluminosilicate glass may be observed in the resulting optical birefringence and on the microscopic level as well. FIGS. 6A and 6B are microscopic images of a composite glass article under non-polarized light and polarized light, respectively. Composite glass article 600 comprises a lithium-based glass ceramic 620 and a lithium zinc aluminosilicate glass 610. Stress 614 at the interface between the lithium-based glass ceramic 620 and the lithium zinc aluminosilicate glass 610, which is induced by the photo-elastic effect, is visible under polarized light (FIG. 6B).

FIG. 7 is a photograph showing the internal stress produced by the patterned composite glass article comprising the negatively photosensitive lithium zinc aluminosilicate glass and the lithium-based glass ceramic described herein. The sample is viewed between crossed polarizers, and the magnitude of the stress is seen through the photo-elastic effect (i.e., stress-induced birefringence). The composite glass article comprises lithium zinc aluminosilicate glass 710 surrounded by the lithium-based glass ceramic 720. The negatively photosensitive lithium zinc aluminosilicate glass in composite glass article 700 has the composition of example 16 (Table 2). When viewed between crossed polarizers, stress patterns 715 appear in the glass regions 710 surrounded by the glass ceramic region 720.

By introducing compressive and tensile stress at the boundary interface of the glass-ceramic and lithium zinc aluminosilicate glass, the patterned composite glass articles described herein may be used to frustrate crack propagation from the edges of such an article. Such an article is schematically shown in FIG. 8. Composite glass article 805 comprises a first region 815 comprising a lithium zinc aluminosilicate glass and a second region comprising a lithium-based glass ceramic 815. Both the lithium zinc aluminosilicate glass and the lithium-base glass ceramic are described herein. If the lithium zinc aluminosilicate glass is positively photosensitive, a central portion 810 of the precursor glass 800 is not exposed to UV radiation, while a peripheral portion 820 of the precursor glass 800 is exposed to UV radiation. Following exposure to the UV radiation (830 in FIG. 8), the precursor lithium zinc aluminosilicate glass is then heated to and held at a first temperature for a predetermined period of time and cooled to room temperature (840), and then heated to and held at a second temperature for a predetermined period of time and cooled to room temperature (850) to form the lithium-based glass ceramic and composite glass article 805. A glass-ceramic is formed in the exposed peripheral portion 820, wherein a compressive stress (815 in FIG. 8) exists within the lithium-based glass ceramic and a tensile stress is created in the lithium zinc aluminosilicate glass at the interface between the lithium zinc aluminosilicate glass and lithium-based glass ceramic. This interfacial stress frustrates the propagation of cracks from the edges of the composite glass article 805.

In those instances in which the lithium zinc aluminosilicate glass is negatively photosensitive, central portion 810 of the precursor glass 800 is exposed to UV radiation, while peripheral portion 820 of the precursor glass 800 is not exposed to UV radiation. Following exposure to the UV radiation (830 in FIG. 8), the precursor lithium zinc aluminosilicate glass is then heated to and held at a first temperature for a predetermined period of time and cooled to room temperature (845) to form the lithium-based glass ceramic and composite glass article 805.

In another aspect, a method of making the composite glass article described hereinabove from a negatively photosensitive lithium zinc aluminosilicate precursor glass (precursor glass) is provided. The composite glass article comprises a lithium zinc aluminosilicate glass and a lithium-based glass ceramic. The lithium-based glass ceramic comprises a residual glass phase and a ceramic phase comprising a stuffed β-quartz lithium-aluminosilicate (virgilite, or $Li_xAl_xSi_{3-x}O_8$) crystal structure and, in some embodiments, a crystalline LiF phase. The lithium-based glass ceramic, in some embodiments, may be opalized or translucent.

A flow chart describing the method is shown in FIG. 9. In a first step 910 of method 900, a negatively photosensitive lithium zinc aluminosilicate precursor glass comprising at least one sensitizing agent and at least one nucleating agent is provided. The precursor glass may be formed by those means known in the art including down-draw (fusion- or slot-draw), up draw, float methods, casting, molding, or the like.

In a second step 920, a first region of the negatively photosensitive lithium zinc aluminosilicate precursor glass is exposed to ultraviolet radiation having a wavelength in a range from about 248 nm to about 360 nm, while a second region of the negatively photosensitive lithium zinc aluminosilicate precursor glass is unexposed to the ultraviolet radiation. In some embodiments, the first region is irradiated with a UV laser such as, for example, a 355 nm pulsed laser or the like, or a beam of continuous UV light such as, for example, a 310 nm Hg arc lamp; while a second region of the precursor glass is not irradiated with (i.e., unexposed to) the UV radiation. In other embodiments, the second region of the precursor glass may be shielded from the UV radiation. Such shielding may include an opaque or reflective film, such as those known in the art, which is applied to the surface of the second region. As previously described hereinabove, the UV radiation may, in some embodiments, have a wavelength of 355 nm, 10 Hz frequency, and a fluence of 6.5 W/cm². In some embodiments, the UV laser or beam is rastered across at least the portion of the negatively photosensitive lithium zinc aluminosilicate precursor glass. For example, the precursor glass may be irradiated for 5 seconds with UV light rastered across the material at a rate of 10 mm/sec. In other embodiments, the negatively photosensitive lithium zinc aluminosilicate precursor glass may be continuously irradiated with UV light for a fixed time period (e.g., for about 1 minute, or for times ranging from about 5 to about 10 seconds).

The UV-exposed negatively photosensitive lithium zinc aluminosilicate precursor glass is then heated to form the lithium-based glass ceramic in the second region, thereby forming the composite glass article (step 930). In some embodiments, the exposed lithium zinc aluminosilicate precursor glass is heated at a temperature in a range from about 550° C. to about 650° C. for at least about 2 hours. In some embodiments, the crystalline lithium-aluminosilicate and LiF phases (when present) in the second region, which was not exposed to the UV radiation, have crystal sizes of at least as large as the wavelength of visible light (≥400 nm) and thus scatter light and are opalized, rendering the ceramic phase opaque or translucent. In some embodiments, however, the crystal sizes in the second region are sufficiently small so as to not scatter or appreciably refract light, thus rendering the ceramic phase transparent.

In yet another aspect, a method of making the composite glass article described hereinabove from a positively photosensitive lithium zinc aluminosilicate precursor glass (precursor glass) is provided. The composite glass article comprises a lithium zinc aluminosilicate glass and a lithium-based glass ceramic. The lithium-based glass ceramic comprises a residual glass phase and a ceramic phase comprising a stuffed β-quartz lithium-aluminosilicate (virgilite, or $Li_xAl_xSi_{3-x}O_8$) crystal structure and, in some embodiments, a crystalline LiF phase. The lithium-based glass ceramic, in some embodiments, may be opalized or translucent.

A flow chart describing the method is shown in FIG. 10. In a first step 1010 of method 1000, a positively photosensitive lithium zinc aluminosilicate precursor glass comprising at least one sensitizing agent and at least one nucleating agent is provided. The precursor glass may be formed by those means known in the art including down-draw (fusion- or slot-draw), up draw, float methods, casting, molding, or the like.

In a second step 1020, a first region of the positively photosensitive lithium zinc aluminosilicate precursor glass is exposed to ultraviolet radiation having a wavelength in a range from about 248 nm to about 360 nm while a second region of the lithium zinc aluminosilicate glass is unexposed (i.e., not exposed) to the ultraviolet radiation. In some embodiments, the first region is irradiated with a UV laser such as, for example, a 355 nm pulsed laser or the like, or a beam of continuous UV light such as, for example, a 310 nm Hg arc lamp; while a second region of the precursor glass is not irradiated with UV radiation. In other embodiments, the second region of the precursor glass may be shielded from the UV radiation. Such shielding may include an opaque or reflective film, such as those known in the art, which is applied to the surface of the second region. As previously described hereinabove, the UV radiation may, in some embodiments, have a wavelength of 355 nm, 10 Hz frequency, and 6.5 W/cm$^2$ energy. In some embodiments, the UV laser or focused beam is rastered across at least the portion of the negatively photosensitive lithium zinc aluminosilicate precursor glass. For example, the precursor glass may be irradiated for 5 seconds with UV light rastered across the material at a rate of 10 mm/sec. In other embodiments, the positively photosensitive lithium zinc aluminosilicate precursor glass may be continuously irradiated with UV light for a fixed time period (e.g., for about 1 minute, or for times ranging from about 5 to about 10 seconds, or, in some embodiments, for up to two hours).

Following exposure to the UV radiation, the lithium zinc aluminosilicate precursor glass is heated at a first temperature for a first predetermined time period to reduce silver using cerium as an optical intermediate (Step 1030). In some embodiments, the first temperature is in a range from about 550° C. to about 700° C., and the first predetermined time period ranges from about 0.5 hours to about 4 hours. The precursor glass is and then cooled to room temperature (approximately 25° C.) (not shown). The exposed precursor glass is then heated at a second temperature for a second predetermined time period to form a lithium-based glass ceramic in the first region, wherein the glass ceramic comprises a residual glass phase and a ceramic phase comprising a stuffed β-quartz lithium-aluminosilicate (virgilite, or $Li_x$-$Al_xSi_{3-x}O_8$) crystal structure and, in some embodiments, a crystalline LiF phase (Step 1040), and thereby forming the composite glass article. In some embodiments, the second temperature is in a range from about 500° C. to about 700° C., and the second predetermined time period ranges from about 0.5 hours to about 4 hours. Finally, the composite glass article is cooled to room temperature (approximately 25° C.) (not shown).

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A strengthened composite glass article comprising
a first region and a second region in contact with the first region at an interface,
the first region comprising a lithium-based glass ceramic, the lithium-based glass ceramic comprising a ceramic phase and a residual glass phase, wherein the ceramic phase comprises a lithium aluminosilicate phase having a lithium aluminosilicate stuffed β-quartz structure, and
the second region comprising a lithium zinc aluminosilicate glass, wherein the lithium zinc aluminosilicate glass is transparent and comprises at least one sensitizing agent and at least one nucleating agent wherein the lithium zinc aluminosilicate glass is in tension and the lithium-based glass ceramic is in compression at the interface to produce a crack propagation region.

2. The composite glass article of claim 1, wherein the first region is spatially separate from the second region.

3. The composite glass article of claim 1, wherein the at least one sensitizing agent comprises at least one of silver and cerium.

4. The composite glass article of claim 1, wherein the at least one nucleating agent comprises at least one halogen.

5. The composite glass article of claim 1, wherein the lithium zinc aluminosilicate glass is negatively photosensitive to the ultraviolet radiation.

6. The composite glass article of claim 5, wherein the composite glass article comprises: from 66 wt % to about 76 wt % $SiO_2$; from about 5 wt % to about 9 wt % $Al_2O_3$; from about 5 wt % to about 8 wt % $Li_2O$; from greater than 0 wt % to about 1 wt % $K_2O$; from greater than 0 wt % to about 6 wt % F$^-$; from greater than 0 wt % to about 0.1 wt % $CeO_2$; from greater than 0 wt % to about 0.05 wt % Ag; and from about 6 wt % to about 8 wt % ZnO.

7. The composite glass article of claim 1, wherein the composite glass article is positively photosensitive to ultraviolet radiation.

8. The composite glass article of claim 7, wherein the composite glass article comprises: from about 68 wt % to about 78 wt % $SiO_2$; up to about 1 wt % $K_2O$; from about 5 wt % to about 10 wt % ZnO; up to about 10 wt % Br—; from about 5 wt % to about 14 wt % $Al_2O_3$; from about 0.01 wt % to about 0.07 wt % $CeO_2$; from about 0.01 wt % to about 0.05 wt % Ag; from about 5 wt % to about 10 wt % $Li_2O$; up to about 1 wt % $Na_2O$; from about 0 wt % to about 3 wt % F—; and up to about 5 wt % $ZrO_2$.

9. The composite glass article of claim 7, wherein the composite glass article comprises: from about 72 wt % to about 76 wt % $SiO_2$; from about 0.5 wt % to about 1 wt % $K_2O$; from about 5 wt % to about 7 wt % ZnO; from about 0.5 wt % to about 0.8 wt % Br—; from about 6 wt % to about 8 wt % $Al_2O_3$; from about 0.01 wt % to about 0.04 wt % $CeO_2$; from about 0.03 wt % to about 0.05 wt % Ag; from about 6 wt % to about 8 wt % $Li_2O$; up to about 0.05 wt % $Na_2O$; from about 2 wt % to about 3 wt % F—; and from about 0.5 wt % to about 5 wt % $ZrO_2$.

10. The composite glass article of claim 7, wherein the composite glass article comprises: from about 68 wt % to about 76 wt % $SiO_2$; from about 0.5 wt % to about 1 wt % $K_2O$; from about 5 wt % to about 8 wt % ZnO; from about 0.5 wt % to about 1.0 wt % Br—; from about 7 wt % to about 14 wt % $Al_2O_3$; from about 0.01 wt % to about 0.07 wt % $CeO_2$; from about 0.03 wt % to about 0.05 wt % Ag; from about 7 wt % to about 9 wt % $Li_2O$; up to about 0.05 wt % $Na_2O$; and from about 2 wt % to about 3 wt % F—.

11. The composite glass article of claim 7, wherein the composite glass article comprises: from about 68 wt % to about 77 wt % $SiO_2$; from about 0.5 wt % to about 1 wt % $K_2O$; from about 6 wt % to about 10 wt % ZnO; from about 0.5 wt % to about 1.0 wt % Br—; from about 7 wt % to about 10 wt % $Al_2O_3$; from about 0.02 wt % to about 0.05 wt % $CeO_2$; from about 0.02 wt % to about 0.05 wt % Ag; from about 7 wt % to about 10 wt % $Li_2O$; up to about 0.05 wt % $Na_2O$; from about 1 wt % to about 3 wt % F—, and up to about 4 wt % $ZrO_2$.

12. The composite glass article of claim 7, wherein the composite glass article comprises: from about 70 wt % to about 78 wt % $SiO_2$; from about 0.5 wt % to about 1 wt % $K_2O$; from about 5 wt % to about 7 wt % ZnO; from 0 wt % to about 10 wt % Br—; from about 6 wt % to about 8 wt % $Al_2O_3$; from about 0.02 wt % to about 0.05 wt % $CeO_2$; from about 0.02 wt % to about 0.05 wt % Ag; from about 6 wt % to about 8 wt % $Li_2O$; up to about 1 wt % $Na_2O$; and from 0 wt % to about 3 wt % F—.

13. The composite glass article of claim 1, wherein the glass ceramic is free of at least one of $Na_2O$, MgO, $P_2O_5$, $TiO_2$, $ZrO_2$, and bromine.

\* \* \* \* \*

UNITED STATES PATENT AND TRADEMARK OFFICE
CERTIFICATE OF CORRECTION

| | | |
|---|---|---|
| PATENT NO. | : 10,703,671 B2 | Page 1 of 1 |
| APPLICATION NO. | : 15/413731 | |
| DATED | : July 7, 2020 | |
| INVENTOR(S) | : George Halsey Beall et al. | |

It is certified that error appears in the above-identified patent and that said Letters Patent is hereby corrected as shown below:

On the Title Page

In Column 2, item (56), Other Publications, Line 1, delete ""Glass-cermaics" and insert -- "Glass-ceramics --, therefor.

Signed and Sealed this
Fifth Day of January, 2021

Andrei Iancu
*Director of the United States Patent and Trademark Office*